Patented May 10, 1932

1,857,914

UNITED STATES PATENT OFFICE

ERNST KEYSSNER AND HELMUT MENGDEHL, OF LUDWIGSHAFEN-ON-THE-RHINE, GERMANY

MIXED FERTILIZER

No Drawing. Application filed July 28, 1930, Serial No. 471,411, and in Germany August 8, 1929.

The present invention relates to improvements in mixed fertilizers containing urea.

For fertilizing purposes use is often made in practice of mixtures of organic waste materials of animal or vegetable origin with fertilizing salts. When in such a case use is made of urea or salts containing urea in mixture with such vegetable material as contains the ferment urease which decomposes urea, generally the stability of the mixture in storage is decreased because the urease splits off ammonia from the urea and thus gives rise to losses in nitrogen.

We have now found that mixtures of vegetable material initially containing urease with urea, or fertilizers containing urea, which are stable in storage, can be obtained by exposing the vegetable material containing urease to an elevated temperature of at lease 80° C. The temperature employed in this treatment should as a rule not exceed 150° C., since otherwise valuable plant nutrients are liable to suffer undesirable decomposition. The time necessary for the treatment depends on the temperature employed and usually varies between a quarter of an hour and one hour. The heat-treatment may be effected for example by means of hot air or of steam or both and may be effected either before the vegetable material is mixed with the urea, or fertilizers containing urea, or shortly after the mixing has been effected. By the treatment in accordance with the present invention the vegetable material initially containing urease is so modified that thereafter it has lost its decomposing action on urea.

The following examples will further illustrate, how the present invention may be carried out in practice, but the invention is not restricted to these examples. The parts are by weight.

Example 1

Soy bean meal freed from oil is heated for ½ hour to about 120° C. and then mixed with urea, preferably in the proportions of 75 parts of soy bean meal to 25 parts of urea. The mixture does not split off ammonia, even when kept in a strongly moist state, whereas a similar mixture prepared from soy bean meal which has not been subjected to the heat treatment, disengages ammonia due to a decomposition of the urea.

In a similar manner other vegetable materials containing urease, as for example jack beans (canavallia ensiformis), sesamum, peanuts (arachis hypogaea), castor beans, or hemp-seed, may be rendered suitable for mixing with urea.

Example 2

A mixture of 60 parts of soy bean meal and 40 parts of urea is heated for about an hour to between 100° and 105° C. A mixed fertilizer is obtained which contains about 23 per cent of nitrogen and which is not decomposed on storage.

What we claim is:—

1. Mixed fertilizers comprising urea and a vegetable material initially containing urease which has been exposed to a temperature between 80° C. and 150° C.

2. Mixed fertilizers comprising urea and soy bean meal freed from oil which has been heated to a temperature between 80° and 150° C.

3. Mixed fertilizers comprising about 25 to 40 parts of urea and 60 to 75 parts of a vegetable material initially containing urease and which has been exposed to a temperature between 80 and 150° C.

4. Mixed fertilizers comprising 75 parts of soy bean meal freed from oil, which has been heated to a temperature of about 120° C., and 25 parts of urea.

5. Mixed fertilizers comprising 60 parts of soy bean meal and 40 parts of urea, said mixture having been heated for about an hour to between 100 and 105° C.

In testimony whereof we have hereunto set our hands.

ERNST KEYSSNER.
HELMUT MENGDEHL.